Figure 1:
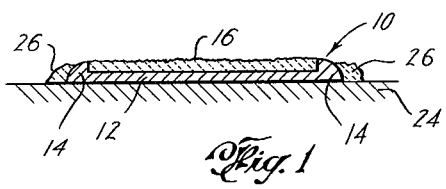

Dec. 4, 1962    G. R. INGELS    3,066,402
METHOD OF AND PRODUCT FOR HARD FACING
Filed Nov. 29, 1956    3 Sheets-Sheet 1

Glenn R. Ingels
INVENTOR.

BY James H. Weiler
ATTORNEY

Dec. 4, 1962  G. R. INGELS  3,066,402
METHOD OF AND PRODUCT FOR HARD FACING
Filed Nov. 29, 1956  3 Sheets-Sheet 2

Glenn R. Ingels
INVENTOR.

BY James H. Weiler

ATTORNEY

Dec. 4, 1962  G. R. INGELS  3,066,402
METHOD OF AND PRODUCT FOR HARD FACING
Filed Nov. 29, 1956  3 Sheets-Sheet 3

Glenn R. Ingels
INVENTOR.

BY James H. Weiler

ATTORNEY

United States Patent Office 3,066,402
Patented Dec. 4, 1962

3,066,402
METHOD OF AND PRODUCT FOR HARD FACING
Glenn Rex Ingels, 5400 S. Park Blvd., Houston 21, Tex.
Filed Nov. 29, 1956, Ser. No. 625,189
5 Claims. (Cl. 29—420.5)

The present invention relates to a product for and a method of providing a hard and wear resistant surface to other products.

More particularly this invention is concerned primarily with a prefabricated hard surfacing or facing article which may be manufactured and applied to surfaces requiring hard facing.

At the present time hard facing is performed primarily by three methods using a hard surfacing rod similar to the rod described in my copending application for Letters Patent, Serial No. 46,605, filed August 28, 1948, for Weld Rods, now Letters Patent No. 2,493,143, issued January 3, 1950. These methods may be classified as the atomic hydrogen arc welding process, the electric arc welding process and the acetylene gas method.

Each of the above methods has certain advantages and disadvantages peculiar to the particular process. The atomic hydrogen arc process provides probably the fastest known method for depositing hard facing alloy grains upon surfaces to be hard faced, and because of the high temperature of the arc generated the base material to be surfaced or faced is only heated locally. Thus, the inherent properties in the base material are only locally affected, and in the case of a heat treated product the surface may be hard faced after heat treatment with only local losses of the heat treated characteristics. There is a distinct and severe disadvantage to the above process, namely, due to the high temperatures generated during the arc welding of the hard facing grains to the surface many of the hard facing grains are melted thereby depositing an inferior hard facing deposit. It is understood that the quality of a hard surfacing deposit is measured by the number and distribution of hard metal alloy grains deposited thereon.

The electric arc welding method of applying hard surfacing rods to surfaces is similar to and has substantially the advantages and disadvantages of the atomic hydrogen arc method above described.

It is believed that the acetylene gas method provides the best process for depositing a hard and wear resisting surface to objects. The primary advantage thereof appears to be that due to the lower welding temperature of the gas flame very few hard metal grains are melted and the force of the flame works the weld deposit to provide a more uniform distribution of grains. The disadvantage inherent in the acetylene gas method, however, is that in order to obtain a sufficient bond between the deposit and the base metal it is necessary that the base metal be heated uniformly to what is known in the art as the "sweating-on" temperature. Thus it is impossible to deposit a hard surfacing material by this method on a heat treated base metal without destroying the inherent heat treatment properties of the latter. Moreover, a considerable length of time is necessary to deposit the hard surfacing material on the metal surface. Thus it would be of considerable advantage to the trade to be able to combine the good quality hard facing deposit as provided by the gas flame method with the speed of deposition of the arc methods. Moreover, hard metal deposits after deposition are hard and brittle and therefore are not capable of being formed to a desired shape or arc welded without danger of cracking. Thus, in the past, and by present known methods, the deposits of hard surfacing material have always been applied to the final desired position with considerable loss in the quality of deposit or loss in the speed of deposition thereof and loss in the heat treatment properties of the materials being hard faced.

Accordingly, it is a prime object of my invention to provide a product and a method of hard surfacing metals which combines the quality deposition of the acetylene gas method and the speed of the arc method and where the disadvantages of each method are obviated.

It is a further object of my invention to provide a hard facing support which includes an extremely hard facing deposit and a ductile weldable material combined in such manner to permit the support to be welded to the position requiring wear resistance.

It is still a further object of my invention to provide such a support which is ductile enough to be formed to any desired shape before or after the deposition of hard facing particles thereon.

It is a feature of my invention to provide an article of manufacture in which the hard facing material is deposited in such a way as to provide a high quality deposition combined with a weldable material by which the article may be speedily secured to the surface requiring wear resisting qualities.

It is still a further feature of my invention to provide such an article fulfilling the above objects and possessing the above features which may be speedily welded to any surface requiring wear resisting qualities and which can be removed by merely machining off the welded beads so securing the article to the surface.

It is still a further object of this invention to provide a hard-surfacing article which includes a weldable support having discretely-spaced metal abrasive particles or grains welded to the support and providing an abrasive surface on the support, so that the article can be welded as a unit to the article to be hard surfaced by welding along its edge portions.

Figure 2:
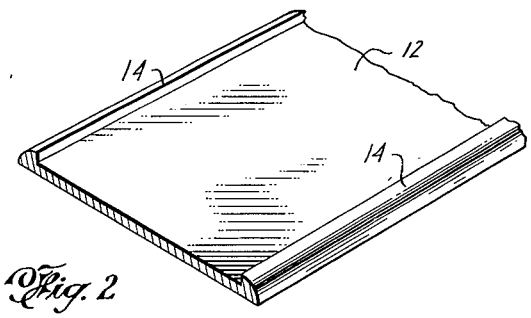
Figure 3:
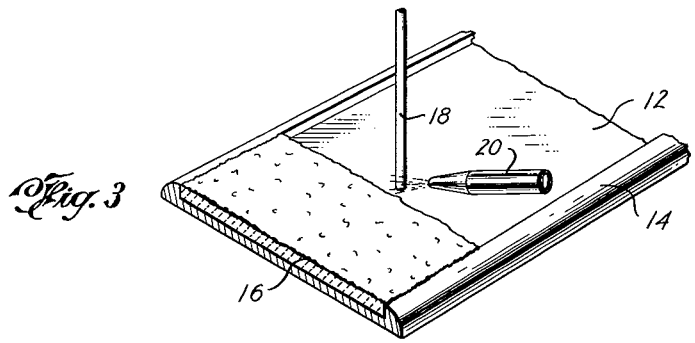
Figure 4:
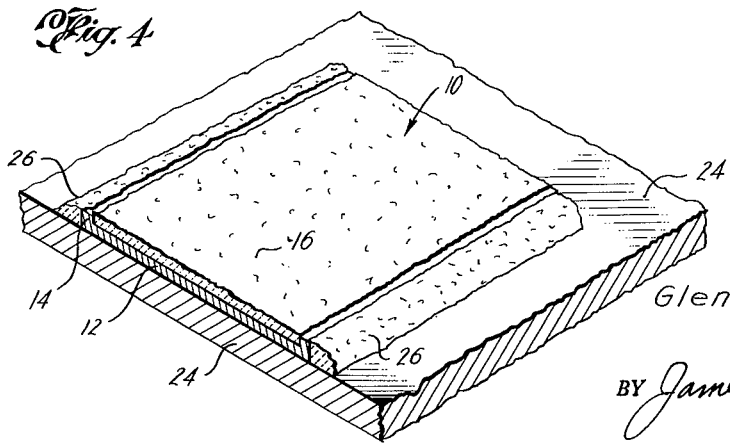
Figure 5:
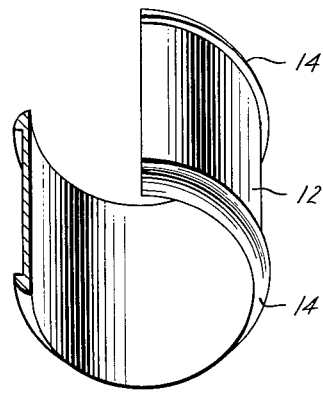
Figure 7:
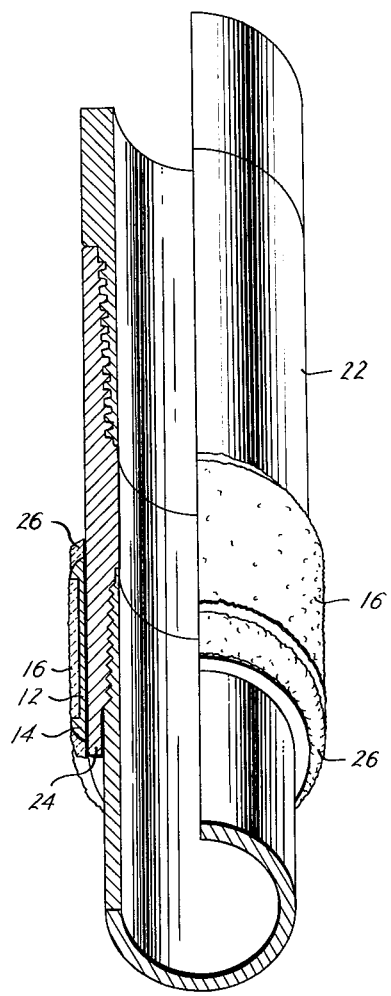
Figure 6:
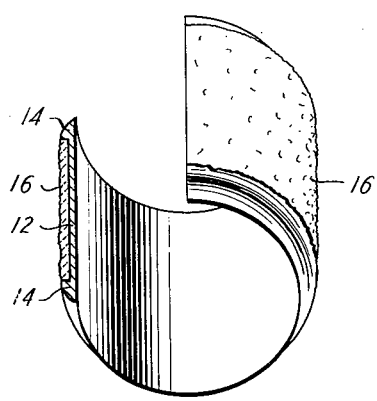
Figure 8:
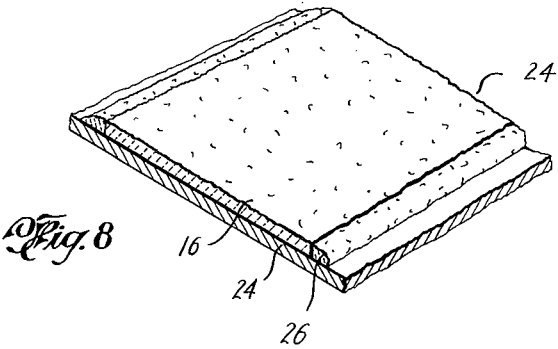
Figure 9:
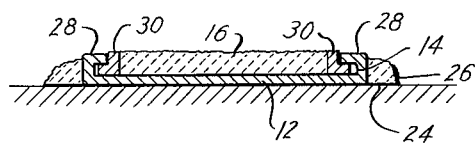
Figure 10:
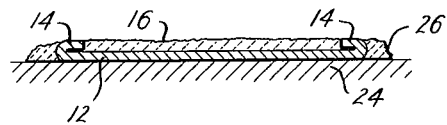
Figure 11:
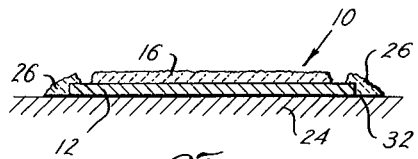

Other and further features and objects will be apparent from the following description of my invention taken in connection with the accompanying drawings where like character references designate like parts throughout the several views and where, FIGURE 1 is a cross-sectional view illustrating a preferred embodiment of my invention providing wear resistant properties to a metal surface, FIGURE 2 is a perspective fragmentary view illustrating a preferred form of the binder material, FIGURE 3 is similar to FIGURE 2 and illustrates a preferred method of applying hard surfacing material to the binder material, FIGURE 4 is similar to FIGURE 1 and is a fragmentary perspective view illustrating the hard facing article welded to a metal surface, FIGURE 5 is similar to FIGURE 2 but illustrates a curved binder support adapted to be placed upon a cylindrical object, FIGURE 6 is similar to FIGURE 5 and illustrates the binder support with a deposit of hard facing material thereon, FIGURE 7 illustrates the form of FIGURE 6 secured to a conventional tool joint, FIGURE 8 illustrates a modification of my invention, and FIGURES 9, 10 and 11 illustrate alternative embodiments of my invention whereby wear resistant properties are provided for metal surfaces.

Referring to the drawings and particularly to FIGURES 1, 2 and 3, I have provided an article for hard facing generally designated by the numeral 10. The article 10 includes a strip-like member 12 which may be of any suitable binder material known to the art. Preferably the binder material should be ductile and weldable and I have found that a mild steel is suitable for my purpose. The binder strip 12 has the upstanding edges 14 disposed longitudinally along the edges of the strip. Preferably, as illustrated, the flanges 14 are integral with and of the same material as the strip 12.

Hard surfacing particles 16 are deposited in discretely-spaced relation between the flanges 14 on the strip 12, and any of the conventional high wear resistant materials may be used for this purpose, such as alloys of tungsten, cobalt or carbon. Ordinarily such materials are obtainable in the form of a rod, such as illustrated as 18, and any of the conventional hard facing weld rods may be used, such as the weld rod described and claimed in my copending application, above identified, or those rods in which hard facing metal grains or particles are packed in metal tubes and sealed, in which the hard facing metal grains are mixed with a flux and the mixture is molded on the outside of a solid metal rod, or any of the other forms known to the art. As illustrated in FIGURE 3 the hard facing particles in the form of a rod 18 are deposited on and welded to the metal strip 12 in discretely-spaced relation by means of an acetylene torch diagrammatically shown as 20. Thus a high heat is not generated and the hard facing grains or particles are not melted substantially as would be the case in the event the arc method of securing the hard surfacing particles to the binder is utilized. Moreover, the hard facing particles are evenly worked onto the strip by the oxyacetylene method of deposition and are welded thereto in discretely-spaced relation to one another, as previously mentioned. As illustrated in FIGURE 3 it is preferable to deposit hard surface particles 16 in such quantity that they will extend up to the upper portion of the flanges 14.

While I have illustrated a flat strip in FIGURES 1 to 4, inclusive, the strip 12 may be curved as illustrated in FIGURE 5 and the hard facing deposit 16 applied onto the curved strip 12. If desired, however, the strip 12 may be substantialy flat, as illustrated in FIGURES 2 and 3, the hard surfacing particles applied thereto, and the strip rolled by any conventional means while it is still hot from the application of the hard surfacing material. Of course, it is manifest, that if desired, the strip may be subsequently reheated and rolled to any desired configuration or that the binder support 12 may be of any desired configuration. The strip as illustrated in FIGURE 6 is in a form to be applied to the conventional tool joint 22 illustrated in FIGURE 7.

In order to hard surface a material, whether the same be substantially flat or circular in configuration, it is only necessary to weld the outer edges or flanges 14 to the surface 24 which is to be hard faced. Due to the speed of arc welding it is preferable to arc weld the band 10 and it has been found that the hard facing article is securely bonded to the surface 24 by means of the welding beads 26. While I have described arc welding of the hard facing band 10 to the surface 24, it is manifest that the oxyacetylene method may be utilized; however, much of the heat treatment of the article being faced will be deteriorated as noted heretofore. It seems manifest that the band 10 may be readily removed from the surface by cutting off the welding beads by any conventional means. Thus when drilling through particularly hard formations in the drilling of oil wells, and the like, several sets of hard facing bands may be applied to the tool joint as the occasion requires. This, of course, may be performed at the rig.

While I have described the binder support 12 as a backing for the discrete hard facing particles, the binder material may be interspersed between the discrete hard facing particles in which case no backing as such is necessary. Any of the facing rods having a binder holding the discrete hard facing particles securely in place, and in such event the hard surfacing rod should be relatively flat and thin, may be welded as a unit to the surface 24, as illustrated in FIGURE 8. The "weld rod" of my copending application, above described, is well suited for this purpose and may be rolled flat enough for the purpose; although, any discrete hard facing particles dispersed in binder material may be utilized. The manner of welding this modification to a metal surface is similar to that described above, and while the grains or particles proximate the securing weld portion may be melted, the remainder thereof will not be affected and a good bond with the surface 24 may be secured with a good quality hard facing deposit.

FIGURES 9, 10 and 11 illustrate alternative arrangements of the strip member or backing 12. It is preferable and desirable in applying or securing the hard facing band to the particular surface to be wear hardened not to have the high heat of welding come into contact with the hard facing deposit 16, inasmuch as such heat tends to melt the hard facing grains. Thus the flanges 14 are provided as illustrated in FIGURE 2. In FIGURE 9 the flanges 14 are inwardly turned at the upper end to provide the substantially horizontal ears 28 to receive the substantially corresponding L-shaped side members 30 to the deposit 16. All other parts are similar to the preferred form and the method of application of discrete hard facing particles thereto and the application thereof to the surface to be hard faced is similar in all respects to the above described.

FIGURE 10 illustrates a still further modification in which the flanges 14 are crimped or pressed down onto the upper surface of the strip 12. The remaining parts are similar to the above described as is the manner of application to a surface to be provided with a wear resisting material, and no further description is believed to be necessary of this modification.

FIGURE 11 illustrates a form of my invention in which the flanges 14 are omitted. In this modification it is only necessary to deposit the discrete hard surfacing particles 16 sufficiently away from the longitudinal edges 32 of the binder strip 12 in order that the welding beads 26 do not come into contact with the deposit 16 while the band 10 is being secured to the surface 24. It seems manifest that it is preferable to avoid bringing a relatively high heat into contact with the deposit 16 in order that melting or cracking of the deposit will not occur, but good results are obtainable even in the event that the welding beads 26 are permitted to extend over and engage the longitudinal edges of the deposit 16 inasmuch as only the edges of the additive material are affected.

The present application is a continuation-in-part of my prior application, Serial Number 116,605, filed September 19, 1949, entitled "Method of and Product for Hard Facing."

It is apparent that I have invented a hard surfacing article and a method of hard surfacing materials which fulfills the above objects and possesses the noted features. It is apparent that the binder support or material may be in any desired form or incorporated with the discrete hard surfacing particles and that numerous changes may be made in the details noted. Thus my invention is of wide scope and application and I intend to limit myself only by the scope of the appended claims.

I claim:

1. A method of hard surfacing the surface of metals requiring wear resistant properties comprising, placing on and conforming to such surface a weldable and malleable support having hard metal particles bonded thereto and providing a wear resistant surface therefor, and welding edges of such support to such first mentioned surface.

2. A method of hard surfacing the surface of metals requiring wear resistant properties comprising placing on and conforming to such surface a support of weldable and malleable binder material, said support having welded thereto a wear resisting surface consisting of hard metal grains, such support having edges free of such hard metal grain, and welding such free edges of the support to such first mentioned surface.

3. A method of hard surfacing the surface of metals requiring wear resistant properties comprising placing on and conforming to such surface a support of weldable and malleable binder material, said support having welded thereto an abrasive surface including discretely-spaced hard metal abrasive particles, said support having edges free of such particles, and welding the free edges of the support to the first-mentioned surface.

4. A unitary hard surfacing article adapted to be conformed and welded as a unit to a metal surface to be hard surfaced comprising a weldable and malleable backing member, upstanding weldable longitudinal edge portions on said backing member, and discretely-spaced hard metal abrasive grains bonded to said backing member defining an abrasive surface between said longitudinal edge portions, said edge portions adapted to be readily and easily welded to a metal surface.

5. A unitary hard surfacing article adapted to be conformed and welded to a tool joint and the like comprising a weldable and ductile support adapted to conform about said tool joint, longitudinal upstanding edges on said support free of hard metal abrasive particles, and discretely-spaced hard metal abrasive particles bonded to the surface of said support and providing an abrasive surface between said upstanding edges, said edges adapted to be welded to said tool joint and the like.

References Cited in the file of this patent

UNITED STATES PATENTS

| | | |
|---|---|---|
| 1,904,568 | Taylor | Apr. 18, 1933 |
| 1,939,468 | Simons | Dec. 12, 1933 |
| 1,960,879 | Russell | May 29, 1934 |
| 1,977,128 | Hawkins | Oct. 16, 1934 |
| 2,044,853 | Laise | June 23, 1936 |
| 2,289,311 | Wellman | July 7, 1942 |
| 2,393,323 | Hungerford | Jan. 22, 1946 |
| 2,462,821 | Wellman | Feb. 22, 1949 |
| 2,506,326 | Adams | May 2, 1950 |
| 2,673,480 | Wellman | Mar. 30, 1954 |
| 2,686,439 | Tobert | Aug. 17, 1954 |